US008900766B2

(12) United States Patent
Rogahn et al.

(10) Patent No.: US 8,900,766 B2
(45) Date of Patent: Dec. 2, 2014

(54) AUTOMATED COLD STORAGE PROTECTION FOR A FUEL CELL SYSTEM

(71) Applicant: GM Global Technology Operations LLC, Detriot, MI (US)

(72) Inventors: Aaron Rogahn, Rochester, NY (US); Bruce J. Clingerman, North Rose, NY (US); Michael Cartwright, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 260 days.

(21) Appl. No.: 13/631,515

(22) Filed: Sep. 28, 2012

(65) Prior Publication Data
US 2014/0093801 A1  Apr. 3, 2014

(51) Int. Cl.
*H01M 8/02* (2006.01)
*H01M 8/04* (2006.01)
*B60K 1/00* (2006.01)

(52) U.S. Cl.
USPC ........... 429/429; 429/432; 429/433; 429/444; 180/65.1

(58) Field of Classification Search
USPC .......... 429/429, 432, 433, 444, 435, 413, 513
See application file for complete search history.

(56) References Cited

U.S. PATENT DOCUMENTS

| | | | |
|---|---|---|---|
| 2004/0001982 A1* | 1/2004 | Reiser et al. | 429/13 |
| 2004/0005487 A1* | 1/2004 | Matoba | 429/22 |
| 2005/0136297 A1* | 6/2005 | Inai et al. | 429/13 |
| 2007/0298289 A1* | 12/2007 | Clingerman et al. | 429/13 |
| 2008/0081224 A1 | 4/2008 | Burch | |
| 2009/0148728 A1* | 6/2009 | Fujita | 429/13 |
| 2011/0003215 A1* | 1/2011 | Tanaka et al. | 429/413 |

* cited by examiner

*Primary Examiner* — Kenneth Douyette
(74) *Attorney, Agent, or Firm* — John A. Miller; Miller IP Group, PLC

(57) ABSTRACT

A system and method for selectively determining whether a freeze purge should be performed at shut-down of a fuel cell stack. The method includes identifying that the vehicle has been keyed off and then determining whether a stack membrane humidification value is less than a predetermined humidification value that identifies the humidification of membranes in fuel cells in the fuel cell stack. If the stack membrane humidification value is not less than the predetermined humidification value, then the method determines if the ambient temperature is below a predetermined ambient temperature, and if so, performs the freeze purge. If the ambient temperature is not below the predetermined ambient temperature, then the method performs a short non-freeze purge of the flow channels in the fuel cell stack. The method determines a wake-up time for a controller for a next time to determine whether a freeze purge should be performed.

20 Claims, 2 Drawing Sheets

AUTOMATED COLD STORAGE PROTECTION FOR A FUEL CELL SYSTEM

BACKGROUND OF THE INVENTION

1. Field of the Invention

This invention relates generally to a system and method for selectively providing a freeze purge of a fuel cell stack and, more particularly, to a system and method for selectively providing a freeze purge of a fuel cell stack at system shut-down that considers cell membrane humidification, ambient temperature and other factors.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton-conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack. The stack also includes flow channels through which a cooling fluid flows.

A fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

As is well understood in the art, fuel cell membranes operate with a controlled hydration level so that the ionic resistance across the membrane is low enough to effectively conduct protons. The relative humidity (RH) of the cathode outlet gas from the fuel cell stack is typically controlled to control the hydration level of the membranes by controlling several stack operating parameters, such as stack pressure, temperature, cathode stoichiometry and the relative humidity of the cathode air into the stack. It is known in the art to recover water from the cathode exhaust stream and return it to the stack via the cathode inlet airflow. Many devices could be used to perform this function, such as a water vapor transfer (WVT) unit. By holding a particular set-point for cathode outlet relative humidity, for example 80%, the proper stack membrane hydration level can be maintained.

It is known in the art to provide high frequency resistance (HFR) measurements of the membranes in a fuel cell stack to provide an accurate measurement of the water or membrane hydration in the fuel cell stack. HFR measurement systems provide a high frequency component on the electrical load of the stack, which operates to create a high frequency ripple on the current output of the stack. The resistance of the high frequency component is measured, which is a function of the amount of water in the stack.

At fuel cell system shut-down, it is desirable that the membranes have a certain hydration level so they are not too wet or too dry. This is typically accomplished by purging either the cathode side of the stack or both the cathode and anode side of the stack with dry air for a certain period of time. In one known technique, the purge of the anode side occurs by air being forced through the membranes from the cathode side. Too much water in the stack may cause problems for low temperature environments where freezing of the water could produce ice that blocks flow channels and affects the restart of the system. However, too long of a purge could cause the membranes to become too dry where the membranes will have too low of a protonic conductivity at the next system restart that affects restart performance as well as reduces the durability of the stack. The actual target amount of grams of water in the stack will vary depending on the system and certain system parameters.

For a fuel cell stack having three hundred fuel cells, and an active area near 400 cm$^2$ per cell, the stack may have about two hundred grams of water when the system is shut down. It is desirable that a stack of this size have about twenty-three grams of water after system shut-down so that the membranes are properly hydrated. Twenty-three grams of water is a stack $\lambda$ of three, where $\lambda$ represents the membrane hydration defined as the number of water molecules for each sulfonic acid molecule in the membrane for each fuel cell. By knowing how much water is actually in the fuel cell stack at system shut-down, a desirable air purge flow rate and air purge duration can be provided so that the target value of $\lambda=3$ can be achieved. Models can be employed to estimate the amount of water in the stack based on stack operating parameters during operation of the fuel cell system.

If a fuel cell stack has too much water in it from the last system shut-down, the water generated during a long start-up may block gas flow channels. Typically, the colder the stack is at start-up the longer it takes to adequately heat up the stack and the more likely that the water generated during start up will block the gas flow channels. Therefore, at very cold start-up temperatures, such as below −15° C., it takes longer for the fuel cell stack to heat up to 0° C. Consequently, the shut-down process becomes very critical for a successful restart of the fuel cell stack, particularly when the fuel cell stack temperature is −15° C. or colder.

The stack purge process when a fuel cell system is being shut-down and a system freeze start-up process require significant hydrogen fuel, which if not needed is wasteful. Certain situations would not require a freeze purge shut-down of a fuel cell stack, such as a short run time or operating in a warm environment. Further, performing the freeze purge to reduce the amount of water in the fuel cell membranes may be desirable for a freeze start-up process, but drying out the membranes to this degree has an adverse effect for membrane durability because increasing and reducing the RH of the membrane, known as RH cycling, causes pin holes to be formed in the membrane, which effect membrane performance. Therefore, from a membrane durability standpoint, it is desirable to limit the number of freeze purges. Thus, if it is known that a freeze condition will not occur when the fuel cell system is off, it is beneficial to not perform a shut-down freeze purge and the subsequent freeze start-up procedure.

One way to determine if a freeze purge is not necessary at system shut-down is to monitor the ambient temperature and if that temperature is not below a certain predetermined temperature, then the freeze purge will not be performed. However, other things, such as time since last key off of the vehicle, are also factors in determining whether the freeze purge will be necessary.

SUMMARY OF THE INVENTION

In accordance with the teachings of the present invention, a system and method are disclosed for selectively determining whether a freeze purge should be performed at shut-down of a fuel cell stack. The method includes identifying that the vehicle has been keyed off and then determining whether a stack membrane humidification value is less than a predetermined humidification value that identifies the humidification of membranes in fuel cells in the fuel cell stack. If the stack membrane humidification value is not less than the predetermined humidification value, then the method determines if the ambient temperature is below a predetermined ambient temperature, and if so, performs the freeze purge. If the ambient temperature is not below the predetermined ambient temperature, then the method performs a short non-freeze purge of the flow channels in the fuel cell stack. If the non-freeze purge is performed, the method determines a wake-up time based on the present temperature at key-off for a system controller for a next time to determine whether a freeze purge should be performed. The method puts the controller in a sleep mode and when the controller wakes up when the wake-up time elapses, the method determines whether a wake-up temperature is less than a predetermined freeze purge temperature, and if not, recalculates the wake-up time based on the wake-up temperature for a next controller wake-up. If the wake-up temperature is less than the freeze-purge temperature, then the method initiates a vehicle auto-start to warm the stack up to a predetermined temperature, and once the stack reaches the temperature, performs the freeze purge, after which the system is put back in the sleep mode with no more wake ups.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for selectively determining whether a freeze purge should be performed at fuel cell system shut-down is merely exemplary in nature, and is in no way intended to limit the invention or its applications or uses. For example, the present invention has particular application for a fuel cell system on a vehicle. However, as will be appreciated by those skilled in the art, the system and method of the invention will have application for other fuel cell systems and other applications.

Figure 1:
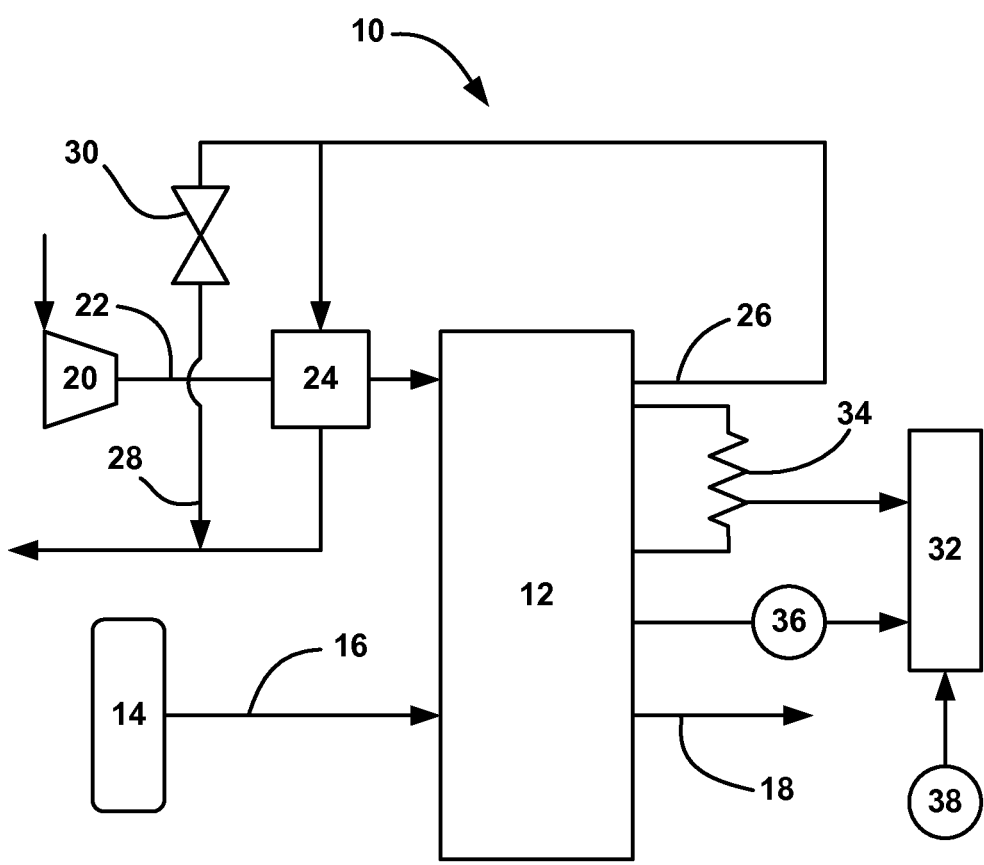
FIG. 1 is a schematic block diagram of a fuel cell system.

FIG. 1 is a schematic block diagram of a fuel cell system 10 including a fuel cell stack 12. The fuel cell stack 12 receives hydrogen gas from a hydrogen source 14 on an anode input line 16 and an anode exhaust gas is exhausted from the stack 12 on an anode exhaust gas line 18. A compressor 20 provides an air flow to the cathode side of the fuel cell stack 12 on a cathode input line 22 through a water vapor transfer (WVT) unit 24 that humidifies the cathode input air. A cathode exhaust gas is output from the stack 12 on a cathode exhaust gas line 26. The cathode exhaust gas line 26 directs the cathode exhaust to the WVT unit 24 to provide the water to humidify the cathode input air. A by-pass line 28 is provided around the WVT unit 24 and a by-pass valve 30 is provided in the by-pass line 28, where the valve 30 is controlled to selectively redirect the cathode exhaust gas through or around the WVT unit 24 to provide the desired humidity for the cathode input air.

A controller 32 controls the by-pass valve 30 and the compressor 20. A high frequency resistance (HFR) circuit 34 measures the HFR of the fuel cell stack 12, thereby allowing the cell membrane humidification level $\lambda$ of the fuel cell stack 12 to be determined by the controller 32. A fuel cell stack temperature sensor 36 provides a temperature measurement of the fuel cell stack 12 and an ambient temperature sensor 38 provides an ambient temperature measurement.

As will be discussed in detail below, the present invention proposes a shut-down process of the fuel cell system 10 that selectively determines whether a freeze purge will be performed based on various factors so that the freeze purge is not performed unless it is necessary, and thus system resources, such as hydrogen fuel, can be efficiently used, and RH cycling of the membranes can be reduced to increase stack durability. As discussed above, a freeze purge is an extended purge when the vehicle 10 is keyed off that causes the system 10 to continue running for some period of time after system shut-down. As the water is pushed out of the flow channels during the purge, a saturated membrane will cause more water to flow into the channels that will then need to also be purged out. It will be understood that the freeze purge discussed herein is more robust than the short quick purge that removes water from the flow channels of the stack 12 that is performed at every shut-down unless the freeze purge is performed.

Figure 2:
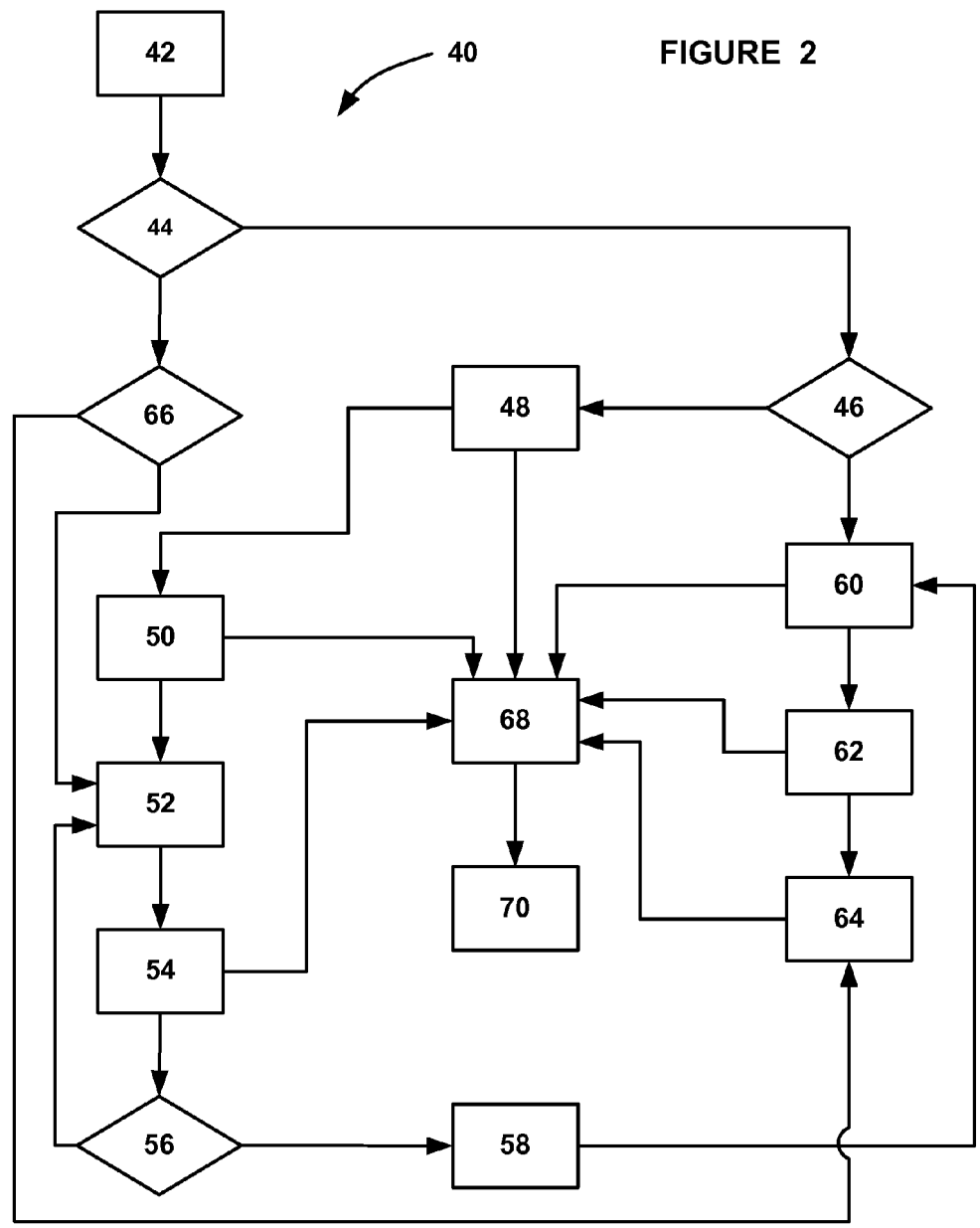
FIG. 2 is a flow chart diagram showing a process for selectively determining whether a freeze purge should be performed at fuel cell system shut-down.

FIG. 2 is a flow chart diagram 40 showing the operation of an algorithm for selectively determining whether a freeze purge of the fuel cell stack 12 should be performed at fuel cell system shut-down. The algorithm determines that the vehicle driver has keyed-off the system 10 at box 42, and then determines whether the membrane humidification value $\lambda$ is less than a predetermined $\lambda$ value, here 4 in this non-limiting example. As discussed above, $\lambda$ is a representation of the water molecules in the membranes of the fuel cells in the stack 12, where the higher the value $\lambda$ the more water molecules are present. Determining the $\lambda$ value is performed because there may be certain times where significant water has not been generated in the stack 12, such as when the vehicle 10 has only been on for a short period of time, where the λ value will indicate that the freeze purge is not necessary. It has been determined that a λ value of 4 or less indicates a sufficiently dry membrane where frozen water within the stack 12 would not be a problem at the next system start-up. The λ value can be determined by any suitable manner, such by calculating the HFR of the fuel cells in the stack 12 using the circuit 34 in combination with a stack cooling fluid temperature. It is also known to monitor the inlet relative humidity of the cathode air to the fuel cell stack 12 that can then be used to determine the λ value. A model can be employed based on the RH of the cathode inlet air and the amount of water that the fuel cells would generate based on stack current density.

If the λ value is greater than 4 at the decision diamond 44, meaning there is significant water in the cell membranes, then the algorithm proceeds to decision diamond 46 to determine whether the freeze purge is necessary. Particularly, the algorithm determines whether the ambient temperature is less than a certain very low temperature, such as −15° C., where a freeze purge shut-off sequence would be necessary because the stack 12 would likely be frozen at the next system start-up. The temperature of −15° C. is by way of non-limiting example and is a calibratable temperature based on various system parameters and testing techniques for a particular fuel cell system. Thus, other temperatures may be more suitable for other systems. As will be discussed in detail below, if a freeze purge is not performed at system shut-down, then the algorithm periodically wakes up the controller 32 to determine if a freeze purge has become necessary from the last system shut-down. This periodic determination of whether a freeze purge becomes necessary requires a system warm-up before the freeze purge, which requires significant hydrogen fuel to perform the warm-up and then the freeze purge. The temperature −15° C. is selected as an optimization temperature in a non-limiting embodiment that if the ambient temperature is less than the optimization temperature, the freeze purge would be immediately performed when the stack 12 may already be warm to save the fuel required for a warm-up process prior to the freeze purge, discussed in more detail below.

If the ambient temperature is warmer than −15° C. at the decision diamond 46, meaning a freeze start-up procedure would be less likely, then the algorithm proceeds to box 48 to determine if a shut-down stack warm-up process to raise the stack temperature to some predetermined values, such as 10° C., is needed, also discussed in more detail below. This step is usually not required, and thus the algorithm will pass through it, but may be required for a cold, but not frozen quick-key off, such as a −10° C. ambient start, a stack temperature of 5°, and with a 15 second run to key-off.

The algorithm then causes the system 10 to perform a normal non-freeze shut-down at box 50 that does not include a freeze purge. The shut-down process does perform a quick shut-down purge of the stack 12, such as for 2 seconds at a purge flow of 30 g/s, where the flow rate and time would be based on the temperature of the stack 12. This non-freeze purge removes water in the various channels to prevent stack damage as a result of water expanding and damaging system components. For example, if a decommissioned vehicle is frozen and/or to get enough water out of the stack to avoid accelerated stack plate corrosion.

The algorithm then determines a wake-up time $T_{wake}$ at box 52 that will cause the controller 32 to wake-up to determine if a frozen purge has become necessary since the last non-freeze shut-down has been performed at the box 50. Particularly, for example, a calibratable temperature function $T_{wake}=f(T_{amb}, T_{fcs})$ is used to determine the next controller wake-up time, where $T_{fcs}$ is the temperature of the stack 12 and $T_{amb}$ is the ambient temperature. The process at the box 48 is performed so that if the stack 12 has only been run for a short period of time where it is relatively cold, but not less than the −15° C. at the decision diamond 46, the temperature of the stack 12 is increased to some predetermined temperature, for example, 10° C., so that the temperature of the stack 12 used in the determination of the wake-up time $T_{wake}$ determined at the box 52 is not very short. Once the time $T_{wake}$ is determined, the controller 32 goes to sleep at box 54 until the time $T_{wake}$ has elapsed. In one embodiment, a look-up table is provided that gives the wake-up time $T_{wake}$ for the possible combined values of the ambient temperature $T_{amb}$ and the fuel cell stack temperature $T_{fcs}$ for temperature function.

When the controller 32 wakes-up after $T_{wake}$ has elapsed, the algorithm determines whether the function $f(T_{amb}, T_{fcs})$ for the combination of the ambient temperature $T_{amb}$ and the fuel cell stack temperature $T_{fcs}$ is below a predetermined temperature, for example, 5° C., where there is a risk of a stack freeze, at decision diamond 56. If the temperature function is not less than the predetermined temperature at the decision diamond 56, then the algorithm resets the wake-up time $T_{wake}$ based on the new ambient temperature $T_{amb}$ and fuel cell stack temperature $T_{fcs}$ using the look-up table at the box 52, and continues this loop until there is a crank request, discussed below, or the temperature function has fallen below the predetermined temperature at the decision diamond 56. The algorithm uses the combination of the ambient temperature $T_{amb}$ and the fuel cell stack temperature $T_{fcs}$ because different combinations of these temperatures may cause the control to do different things. For example, if the fuel cell stack temperature $T_{fcs}$ is 2° C., but the ambient temperature $T_{amb}$ is 6° C., the algorithm may not be concerned with the stack temperature because the ambient temperature is warming up and the stack temperature will follow accordingly. One possible function may be to always put the controller 32 back in the sleep mode with a new calculated wake-up time if the ambient temperature $T_{amb}$ is greater than the fuel cell stack temperature $T_{fcs}$.

If the temperature function is below the predetermined temperature at the decision diamond 56, indicating a possible freeze condition, then the algorithm initiates an auto-start of the system 10 at box 58 to increase the temperature of the fuel cell stack 12. The auto-start is a minimum operation of the fuel cell stack 12, where various ancillary sources, such as lights, wipers, radio, AC, etc., are kept off. After the auto-start, the system 10 is warmed up at box 60 in anticipation of the freeze purge and subsequent shut-down at box 62. The warm-up process can be performed at any suitable stack current density to any suitable temperature. In one non-limiting example, the compressor 20 is operated at 30 kW, 12% hydrogen gas is provided to the cathode, the warm-up is performed to a stack temperature of 70° C. and is held at this temperature for 30 seconds, where 30 seconds is a non-limiting calibratable time based on testing and experimentation. The warm-up process is held for the calibrated period of time so that all of the system components, including the end cells and other components, such as valves and tubing, have reached the desired temperature, here 70° C. The freeze purge is then performed at the box 62 and the controller 32 goes to sleep at box 64 with no more concerns to wake-up to determine whether a freeze purge is necessary.

If the algorithm determines that the ambient temperature $T_{amb}$ is below the calibrated temperature −15° C. at the decision diamond 46, then the algorithm proceeds directly to the shut-down warm-up process at the box 60 in preparation for the freeze purge at the box 62. As discussed above, if the ambient temperature $T_{amb}$ is below the calibratable temperature at the decision diamond 46, then the stack 12 almost assuredly will be frozen at the next system start-up, which would require the warm up process at the box 60 if the normal shut down was performed at the box 50. Since the stack 12 is likely to already be at the 70° C. temperature required for the warm-up at the box 60 when it is shut-down, then the algorithm proceeds directly to the box 60 to perform the freeze shut-down at the box 62 in this situation.

If the λ value is less than 4 at the decision diamond 44, then the algorithm determines whether the last system shut-down was a freeze shut-down at decision diamond 66, and if not, proceeds directly to the box 52 to determine the next wake-up time for the controller 32 to determine whether an auto-start is necessary at the box 58. If the last shut-down was a freeze shut-down at the decision diamond 66, then the algorithm proceeds directly to the box 64 until a crank request.

The shut-down sequence and key-off discussed above may be interrupted at any time by a crank request for a vehicle start-up sequence. The present invention recognizes this and allows the shut-down sequence to be interrupted at any time to respond to the crank request. Particularly, at each of the boxes 48, 50, 54, 60, 62 and 64, if a crank request is received at box 68, the algorithm will stop the shut-down step it is currently in, and proceed directly to a normal start-up sequence at box 70.

As will be well understood by those skilled in the art, the several and various steps and processes discussed herein to describe the invention may be referring to operations performed by a computer, a processor, or other electronic calculating device that manipulates and/or transforms data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining if and when to perform a freeze purge of flow channels in a fuel cell stack on a vehicle, said method comprising:

identifying that the vehicle has been keyed off;

determining whether a stack membrane humidification value is less than a predetermined humidification value that identifies the humidification of membranes in fuel cells in the fuel cell stack;

determining if an ambient temperature is less than a predetermined ambient temperature if the membrane humidification value is not less than the predetermined humidification value;

performing a short non-freeze purge of the flow channels in the fuel cell stack if the ambient temperature is not less than the predetermined ambient temperature;

determining a wake-up time for a system controller based on a wake-up temperature for a next time to determine whether a freeze purge should be performed;

causing the controller to go into a sleep mode for the wake-up time after the wake-up time has been determined;

determining whether the wake-up temperature is less than a predetermined freeze-purge temperature when the controller wakes up after being put in the sleep mode and the wake-up time has elapsed;

determining a new wake-up time for the system controller based on the wake-up temperature if the freeze-purge temperature is not less than the wake-up temperature;

causing a vehicle auto-start if the freeze-purge temperature is less than the wake-up temperature;

performing a stack warm-up process after the vehicle auto-start to increase the temperature of the stack to a predetermined stack temperature; and performing the freeze purge after the fuel cell stack has been increased to the predetermined stack temperature.

2. The method according to claim 1 further comprising proceeding directly to performing the stack warm-up process to perform the freeze purge if the ambient temperature is less than the predetermined ambient temperature.

3. The method according to claim 1 further comprising determining whether a last shut-down of the vehicle included a freeze purge if the membrane humidification is less than the predetermined humidification value, and if not, proceeding to the step of determining the wake-up temperature, and if so, causing the controller to go into the sleep mode.

4. The method according to claim 1 further comprising performing a stack warm-up process if the ambient temperature is not below the predetermined ambient temperature before performing the short non-freeze purge.

5. The method according to claim 1 wherein performing the stack warm-up process includes holding the stack at the predetermined stack temperature for a predetermined period of time so that system elements other than the fuel cell stack are increased to the predetermined stack temperature.

6. The method according to claim 1 wherein the wake-up temperature is based on the ambient temperature and a fuel cell stack temperature.

7. The method according to claim 1 wherein the humidification value is a ratio of water molecules to sulfonic acid molecules in the fuel cell membranes.

8. The method according to claim 7 wherein the humidification value is 4.

9. The method according to claim 1 wherein the predetermined ambient temperature is about −15° C.

10. The method according to claim 1 wherein the wake-up temperature is about 5° C.

11. The method according to claim 1 further comprising interrupting and stopping any step in the freeze purge determination process if a vehicle crank request is received.

12. A method for determining if and when to perform a freeze purge of flow channels in a fuel cell stack on a vehicle, said method comprising:

identifying that the vehicle has been keyed off;

determining whether a stack membrane humidification value is less than a predetermined humidification value that identifies the humidification of membranes in fuel cells in the fuel cell stack, where the humidification value is a ratio of water molecules to sulfonic acid molecules in the membranes;

determining if an ambient temperature is below a predetermined ambient temperature if the membrane humidification value is not less than the predetermined humidification value;

performing a short non-freeze purge of the flow channels in the fuel cell stack if the ambient temperature is not less than the predetermined ambient temperature;

determining a wake-up time for a system controller based on a wake-up temperature for a next time to determine whether a freeze purge should be performed, where the wake-up temperature is based on a combination of the ambient temperature and a fuel cell stack temperature after the non-freeze purge has been performed;

causing the controller to go into a sleep mode for the wake-up time after the next wake-up time has been determined;

determining whether the wake-up temperature is less than a predetermined freeze-purge temperature when the controller wakes up after being put in the sleep mode and the wake-up time has elapsed;

determining a new wake-up time for the system controller based on the wake-up temperature if the freeze-purge temperature is not less than the wake-up temperature;

causing a vehicle auto-start if the freeze-purge temperature is less than the wake-up temperature;

performing a stack warm-up process after the vehicle auto-start to increase the temperature of the stack to a predetermined stack temperature and holding the stack at the predetermined stack temperature for a predetermined period of time;

performing the freeze purge after the fuel cell stack has been increased to the predetermined stack temperature for the predetermined period of time;

proceeding directly to performing the stack warm-up process to perform the freeze purge if the ambient temperature is less than the predetermined ambient temperature; and interrupting and stopping any step in the freeze purge determination process if a vehicle crank request is received.

13. The method according to claim 12 further comprising determining whether a last shut-down of the vehicle included a freeze purge if the membrane humidification is less than the predetermined humidification value, and if not, proceeding to the step of determining the wake-up temperature, and if so, causing the controller to go into the sleep mode.

14. The method according to claim 12 further comprising performing a stack warm-up process if the ambient temperature is not below the predetermined ambient temperature before performing the short non-freeze purge.

15. A system for determining if and when to perform a freeze purge of flow channels in a fuel cell stack on a vehicle, said system comprising:

means for identifying that the vehicle has been keyed off;

means for determining whether a stack membrane humidification value is less than a predetermined humidification value that identifies the humidification of membranes in fuel cells in the fuel cell stack;

means for determining if an ambient temperature is less than a predetermined ambient temperature if the membrane humidification value is not less than the predetermined humidification value;

means for performing a short non-freeze purge of the flow channels in the fuel cell stack if the ambient temperature is not less than the predetermined ambient temperature;

means for determining a wake-up time for a system controller based on a wake-up temperature for a next time to determine whether a freeze purge should be performed;

means for causing the controller to go into a sleep mode for the wake-up time after the wake-up time has been determined;

means for determining whether the wake-up temperature is less than a predetermined freeze-purge temperature when the controller wakes up after being put in the sleep mode and the wake-up time has elapsed;

means for determining a new wake-up time for the system controller based on the wake-up temperature if the freeze-purge temperature is not less than the wake-up temperature;

means for causing a vehicle auto-start if the freeze-purge temperature is less than the wake-up temperature;

means for performing a stack warm-up process after the vehicle auto-start to increase the temperature of the stack to a predetermined stack temperature; and means for performing the freeze purge after the fuel cell stack has been increased to the predetermined stack temperature.

16. The system according to claim 15 further comprising means for proceeding directly to performing the stack warm-up process to perform the freeze purge if the ambient temperature is less than the predetermined ambient temperature.

17. The system according to claim 15 wherein the means for performing the stack warm-up process holds the stack at the predetermined stack temperature for a predetermined period of time so that system elements other than the fuel cell stack are increased to the predetermined stack temperature.

18. The system according to claim 15 wherein the wake-up temperature is based on the ambient temperature and a fuel cell stack temperature.

19. The system according to claim 15 further comprising means for performing a stack warm-up process if the ambient temperature is not below the predetermined ambient temperature before performing the short non-freeze purge.

20. The system according to claim 15 further comprising means for interrupting and stopping any step in the freeze purge determination process if a vehicle crank request is received.

* * * * *